United States Patent
Lee et al.

(10) Patent No.: US 8,560,119 B2
(45) Date of Patent: Oct. 15, 2013

(54) ROBOT CLEANER AND METHOD OF CONTROLLING TRAVEL OF THE SAME

(75) Inventors: Jun Hwa Lee, Suwon-si (KR); Jae Man Joo, Suwon-si (KR); Dong Won Kim, Hwaseong-si (KR); Jun Pyo Hong, Suwon-si (KR); Woo Ram Chung, Seoul (KR); Jae Young Jung, Suwon-si (KR); Kyung Hwan Yoo, Suwon-si (KR); Hwi Chan Jang, Suwon-si (KR); Jang Youn Ko, Gwangju (KR); Jeong Gon Song, Gwangju (KR); Sam Jong Jeung, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 334 days.

(21) Appl. No.: 12/815,631

(22) Filed: Jun. 15, 2010

(65) Prior Publication Data
US 2010/0324734 A1      Dec. 23, 2010

Related U.S. Application Data

(60) Provisional application No. 61/213,569, filed on Jun. 19, 2009.

(30) Foreign Application Priority Data

Aug. 21, 2009   (KR) ................. 10-2009-0077561

(51) Int. Cl.
   *G05B 15/00*   (2006.01)
(52) U.S. Cl.
   USPC ........... 700/258; 700/245; 700/250; 700/255; 700/260; 700/261; 318/567; 318/568.12; 318/587; 901/1; 901/30; 901/46; 15/319; 15/339; 15/340.1; 15/340.3; 15/377; 210/167.16; 210/416.2; 701/23; 701/26

(58) Field of Classification Search
   USPC ................. 700/245, 250, 255, 258, 260, 261; 15/1.7, 319, 339, 340.1, 340.3, 377; 318/567, 568.12, 587; 210/167.16, 210/416.2; 901/1, 30, 46; 701/23, 26
   See application file for complete search history.

(56) References Cited

U.S. PATENT DOCUMENTS

| | | | | |
|---|---|---|---|---|
| 6,113,117 A | * | 9/2000 | Mimura | 280/47.11 |
| 6,625,846 B2 | * | 9/2003 | Takizawa | 16/20 |
| 6,774,596 B1 | * | 8/2004 | Bisset | 318/568.11 |

(Continued)

OTHER PUBLICATIONS

Ushimi et al. Two Wheels Caster Type Odometer for Omni-Directional Vehicles, 2003, IEEE, p. 497-502.*

(Continued)

*Primary Examiner* — McDieunel Marc
(74) *Attorney, Agent, or Firm* — Staas & Halsey LLP

(57) ABSTRACT

A robot cleaner that travels straight through alignment of drive wheels to move the robot cleaner and a method of controlling travel of the same. Information related to a movement angle of the robot cleaner is detected from angle information of a caster wheel rotating depending upon a state of a floor, such as a carpet in a state in which texture of the carpet occurs in one direction, and, when the movement angle of the robot cleaner deviates due to slippages of the drive wheels, rates of rotation of the drive wheels are adjusted to correct the slippages of the drive wheels such that the robot cleaner easily travels straight.

19 Claims, 8 Drawing Sheets

(56) References Cited

U.S. PATENT DOCUMENTS

| | | | | |
|---|---|---|---|---|
| 6,955,145 | B1* | 10/2005 | McCabe et al. | 123/90.15 |
| 7,237,298 | B2* | 7/2007 | Reindle et al. | 15/319 |
| 2006/0085111 | A1* | 4/2006 | Kojima | 701/38 |
| 2007/0016328 | A1* | 1/2007 | Ziegler et al. | 700/245 |
| 2009/0000839 | A1* | 1/2009 | Ishii et al. | 180/65.5 |
| 2010/0222925 | A1* | 9/2010 | Anezaki | 700/253 |

OTHER PUBLICATIONS

Kim et al. Systematic Isotropy Analysis of Caster Wheeled Mobile Robots with Steering Link Offset Different from Wheel Radius, 2007, IEEE, p. 2971-2976.*

Wada et al. Modeling and Control of a New Type of Omnidirectional Holonornic Vehicle, 1996, IEEE, p. 265-270.*

Kim et al. Local and Global Isotropy of Caster Wheeled Omnidirectional Mobile Robot, 2005, IEEE, p. 3446-3151.*

Lee et al. Kinematic Analysis on Omni-directional Mobile Robot with Double-wheel-type Active Casters, 2007, IEEE, p. 1217-1221.*

Jung et al. Implementation of an Embedded Omni-directional Mobile Robot with Active Caster Wheels, 2007, IEEE, p. 3911-3918.*

El-Shenawy et al., Dynamic Model of a Holonomic Mobile Robot with Actuated Caster Wheels, 2006, IEEE, p. 1-6.*

Lee et al. Command System and Motion Control for Caster-type Omni-directional Mobile Robot, 2005, IEEE, p. 1-7.*

Spenko et al., Analysis and Design of an Omnidirectional Platform for Operation on Non-Ideal Floors, 2002, IEEE, p. 726-731.*

Wada et al. A Synchro-caster Drive System for Holonomic and Omnidirectional Mobile Robots, 2000, IEEE, p. 1937-1942.*

* cited by examiner

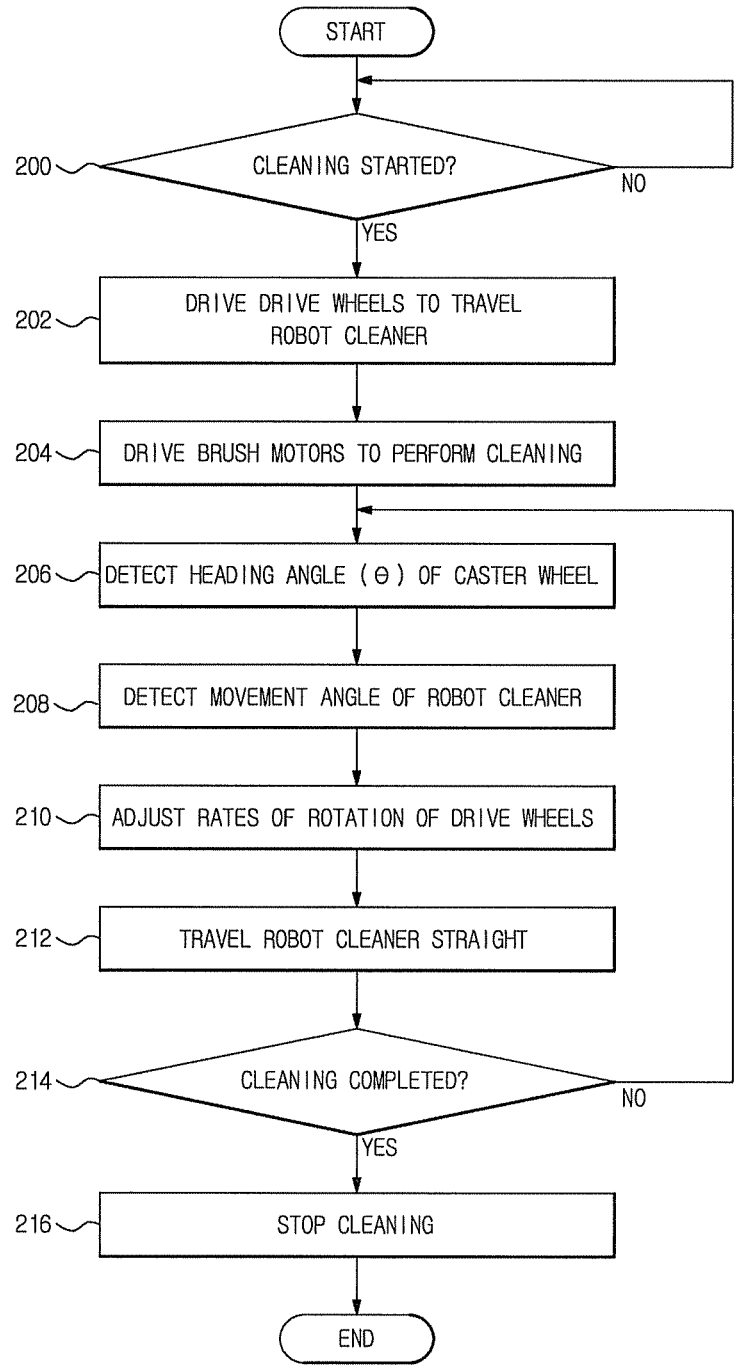

ROBOT CLEANER AND METHOD OF CONTROLLING TRAVEL OF THE SAME

CROSS-REFERENCE TO RELATED APPLICATIONS

This application claims the benefit of U.S. Patent Application No. 61/213,569, filed on Jun. 19, 2009 in the U.S. Patent and Trademark Office, and Korean Patent Application No. 10-2009-0077561, filed on Aug. 21, 2009 in the Korean Intellectual Property Office, the disclosures of which are incorporated herein by reference.

BACKGROUND

1. Field

One or more embodiments relate to a robot cleaner that travels straight through alignment of drive wheels and a method of controlling travel of the same.

2. Description of the Related Art

Generally, a robot cleaner is an apparatus that travels in a cleaning area without user manipulation to suction foreign matter such as dirt from a floor, thereby performing cleaning.

Cleaning a cleaning area using such a robot cleaner entails the robot cleaner repetitively performing cleaning while moving in a predetermined travel pattern. The travel pattern may include a right-angle travel pattern and a random travel pattern. In the right-angle travel pattern (zigzag travel pattern), the robot cleaner turns 90 degrees and then travels straight when the robot cleaner comes across an obstacle (for example, a wall) after straight travel. In the random travel pattern, the robot cleaner turns to an arbitrary direction and then travels straight when the robot cleaner comes across an obstacle (for example, a wall) after straight travel.

A pair of drive wheels are mounted at opposite sides of a lower part of a cleaner body of the robot cleaner to move the cleaner body such that the robot cleaner travels straight. When the robot cleaner travels on a hard floor, such as a wooden floor or a vinyl floor, slippages of the drive wheels are similar to each other, with the result that a rate of rotation of one of the drive wheels is similar to a rate of rotation of the other drive wheel, whereby the robot cleaner easily travels straight. On the other hand, when the robot cleaner travels on a carpet in a state in which texture of the carpet occurs in one direction, slippages of the drive wheels are different from each other, with the result that the robot cleaner does not travel straight but swerves often. In particular, when the texture of the carpet is severe, or the carpet pile is short, slippages of the drive wheels 21 and 22 increase, with the result that the robot cleaner swerves.

To prevent the robot cleaner from swerving, track shapes or materials of the drive wheels have been changed to reduce slippages of the drive wheels. However, such design is limited. For example, when the drive wheels are designed to have protrusions like a snow tire, slippages of the drive wheels may be prevented to some extent on a carpet; however, on a hard floor, the drive wheels may have low contact force with the floor and may be easily worn.

SUMMARY

Therefore, it is an aspect of one or more embodiments to provide a robot cleaner configured to travel straight by detecting information related to a movement angle of the robot cleaner from angle information of a caster wheel rotating depending upon a state of a floor and adjusting rates of rotation of drive wheels based on the detected information and a method of controlling travel of the same.

Additional aspects and/or advantages will be set forth in part in the description which follows and, in part, will be apparent from the description, or may be learned by practice of one or more embodiments.

In accordance with one aspect of one or more embodiments, a robot cleaner includes a cleaner body, drive wheels to move the cleaner body, a caster wheel rotatably mounted to the cleaner body, a heading angle detection unit to detect a heading angle of the caster wheel, and a controller to adjust rates of rotation of the drive wheels based on the heading angle of the caster wheel.

The drive wheels may be mounted at opposite sides of a lower part of the cleaner body to adjust the movement of the cleaner body according to a drive command from the controller.

The heading angle detection unit may detect a deviation angle of the caster wheel signifying left or right deviation depending upon a state of a floor.

The heading angle detection unit may include an encoder provided at the caster wheel to detect a deviation angle of the caster wheel signifying left or right deviation due to slippage of the robot cleaner.

The controller may control a number of rotations of the drive wheels to be adjusted based on the deviation angle of the caster wheel for the cleaner body to travel straight.

The caster wheel may be formed in a shape of a roller or caster and mounted at a front of the cleaner body.

In accordance with another aspect of one or more embodiments, a method of controlling travel of a robot cleaner includes detecting angle information of a caster wheel rotating depending upon a state of a floor and adjusting rates of rotation of drive wheels based on the angle information of the caster wheel to travel the robot cleaner straight.

The drive wheels may be mounted at opposite sides of a lower part of the robot cleaner for the drive wheels to be rotated by drive force from motors.

The detecting the angle information of the caster wheel may include detecting a deviation angle of the caster wheel signifying left or right deviation depending upon the state of the floor.

The detecting the deviation angle information of the caster wheel may include detecting a heading angle of the caster wheel deviating left or right due to slippage of the robot cleaner through an encoder provided at the caster wheel.

The adjusting the rates of rotation of the drive wheels may include changing a number of rotations of the drive wheels based on the deviation angle of the caster wheel to correct a movement angle of the robot cleaner for the robot cleaner to travel straight.

The caster wheel may be mounted at a front of the robot cleaner for the caster wheel to rotate depending upon the state of the floor without drive force from a motor.

In accordance with another aspect of one or more embodiments, a robot cleaner may include wheels, a wheel heading angle deviation detector to detect a heading angle deviation of one of the wheels, and a wheel rotation rate controller to adjust a rate of rotation for at least one of the wheels based on the heading angle deviation.

The wheel heading angle deviation detector may detect the heading angle deviation of a caster wheel rotatably mounted in the robot cleaner.

The robot cleaner may further include an encoder mounted to the caster wheel to detect a heading angle of the caster wheel.

The wheel rotation rate controller may adjust the rate of rotation for a drive wheel mounted at a side of the robot cleaner.

The robot cleaner may further include an obstacle sensor to sense a presence of an obstacle, and a direction in which the obstacle exists with respect to the robot cleaner, and the wheel rotation rate controller may adjust the rate of rotation for the at least one of the wheels while simultaneously avoiding obstacles sensed by the obstacle sensor.

The wheel rotation rate controller may adjust the rate of rotation for the at least one of the wheels based also on a predetermined travel pattern for travel of the robot cleaner.

The robot cleaner may further include a travel distance detector to measure rotational directions of at least two of the wheels, the at least two wheels being drive wheels, and the wheel rotation rate controller may adjust the rate of rotation for at least one of the drive wheels according to the measured rotational directions.

The travel distance detector may include a gyro sensor.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 illustrates a method of controlling travel of the robot cleaner according to an embodiment.

DETAILED DESCRIPTION

Figure 1:
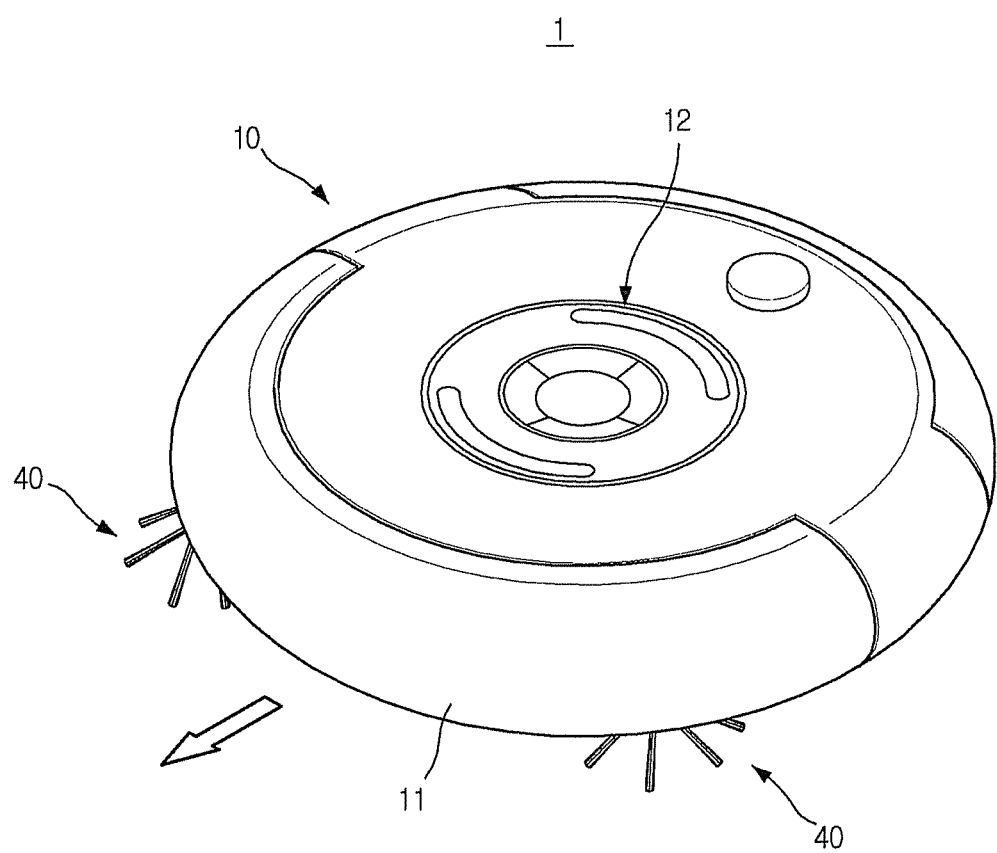
FIG. 1 illustrates an exterior perspective view of a robot cleaner according to an embodiment.

Reference will now be made in detail to one or more embodiments, examples of which are illustrated in the accompanying drawings, wherein like reference numerals refer to the like elements throughout. The embodiments are described below to explain the disclosure by referring to the figures.

Figure 2:
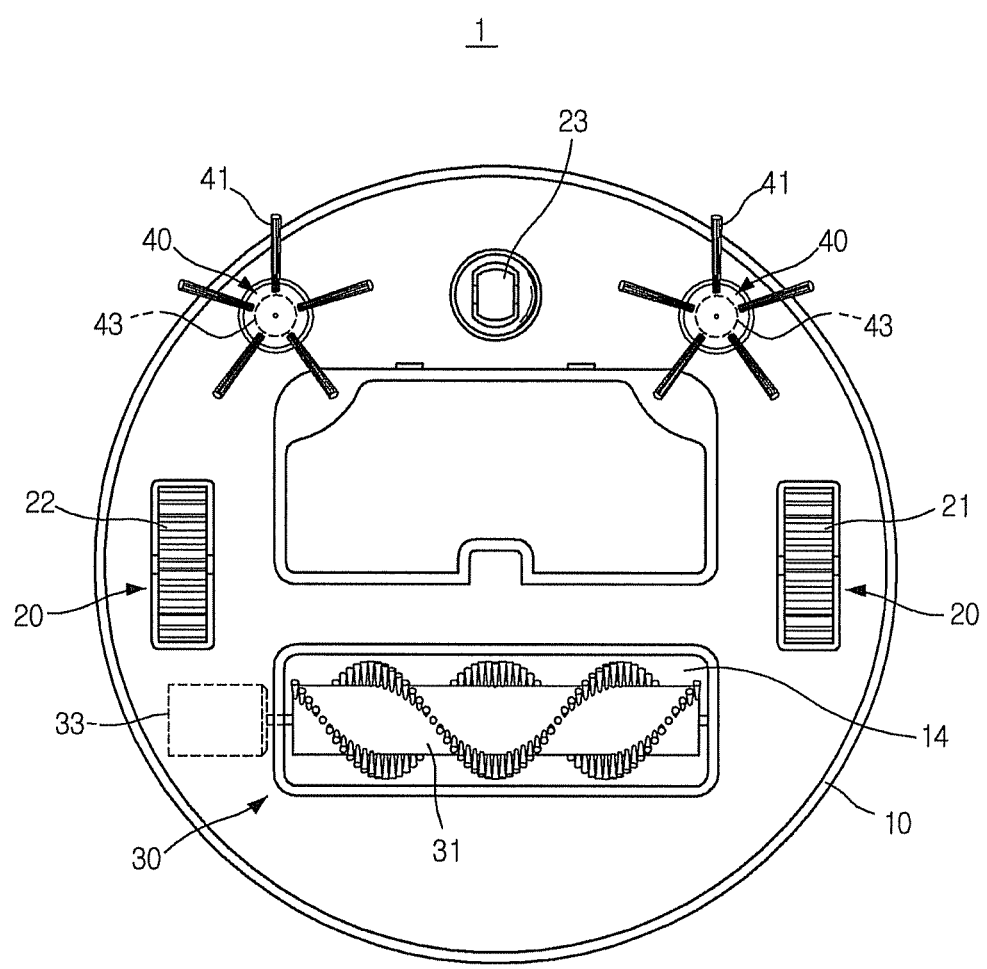
FIG. 2 illustrates a bottom view of a robot cleaner.

FIG. 1 illustrates an exterior perspective view of a robot cleaner according to an embodiment, and FIG. 2 illustrates a bottom view of a robot cleaner.

Referring to FIGS. 1 and 2, the robot cleaner 1 includes a cleaner body 10 to form the external appearance of the robot cleaner 1, a drive unit 20 mounted at the lower part of the cleaner body 10 to move the robot cleaner 1, and brush units 30 and 40 to sweep or scatter dirt from a floor on which the robot cleaner 1 travels to clean the floor.

In addition to the drive unit 20 and the brush units 30 and 40, a contact sensor and a proximity sensor to sense obstacles may be mounted at the cleaner body 10. For example, a bumper 11 mounted at the front of the cleaner body 10 may be used to sense an obstacle such as a wall, and an infrared sensor (or an ultrasonic sensor) (not shown) mounted at the bottom of the cleaner body 10 may be used to sense an obstacle such as a stair. Also, the cleaner body 10 may further include a display 12 to inform a user of information as to a state or operation of the robot cleaner 1.

The drive unit 20 includes a pair of drive wheels 21 and 22 mounted at diametrically opposite sides of the cleaner body 10 to adjust the movement of the robot cleaner 1 and a caster wheel 23 rotatably mounted at the front of the cleaner body 10 such that a heading angle of the caster wheel 23 varies depending upon a state of a floor on which the robot cleaner 1 moves. The caster wheel 23 supports the robot cleaner 1 to stabilize a physical position of the robot cleaner 1 and to prevent the robot cleaner 1 from overturning. The caster wheel 23 may be formed in the shape of a roller or caster.

The drive wheels 21 and 22 are driven forward or backward according to a drive command from a controller, which will be described later, to adjust the movement of the robot cleaner 1. For example, the drive wheels 21 and 22 are driven forward or backward such that the robot cleaner 1 moves forward or backward. Also, the right drive wheel 22 is driven forward while the left drive wheel 21 is driven backward such that the robot cleaner 1 turns left ahead, or the left drive wheel 21 is driven forward while the right drive wheel 22 is driven backward such that the robot cleaner 1 turns right ahead.

The brush units 30 and 40 include a main brush unit 30 disposed adjacent to a suction port 14 formed in the bottom of the cleaner body 10 to sweep or scatter dirt from a floor, thereby improving dirt suction efficiency, and side brush units 40 mounted at opposite sides of the front bottom of the cleaner body 10 to sweep dirt from a floor on which the robot cleaner 1 travels toward the suction port 14.

The main brush unit 30 includes a drum-type rotary brush 31 (hereinafter, referred to as a main brush) having a length equivalent to the suction port 14, disposed adjacent to the suction port 14 in the horizontal direction, and rotatable like a roller to sweep or scatter dirt from a floor and a main brush motor 33 to rotate the main brush 31.

The side brush units 40 include rotary brushes 41 (hereinafter, referred to as side brushes) disposed at opposite sides of the front of the cleaner body 10 while being spaced a predetermined distance from each other and rotatable horizontally with respect to a floor to sweep dirt from the floor toward the suction port 14 and brush motors 43 to rotate the side brushes 41, respectively.

Also, the robot cleaner 1 may further include a dust collector (not shown) to suction and collect foreign matter such as dirt using suction force.

Figure 3:
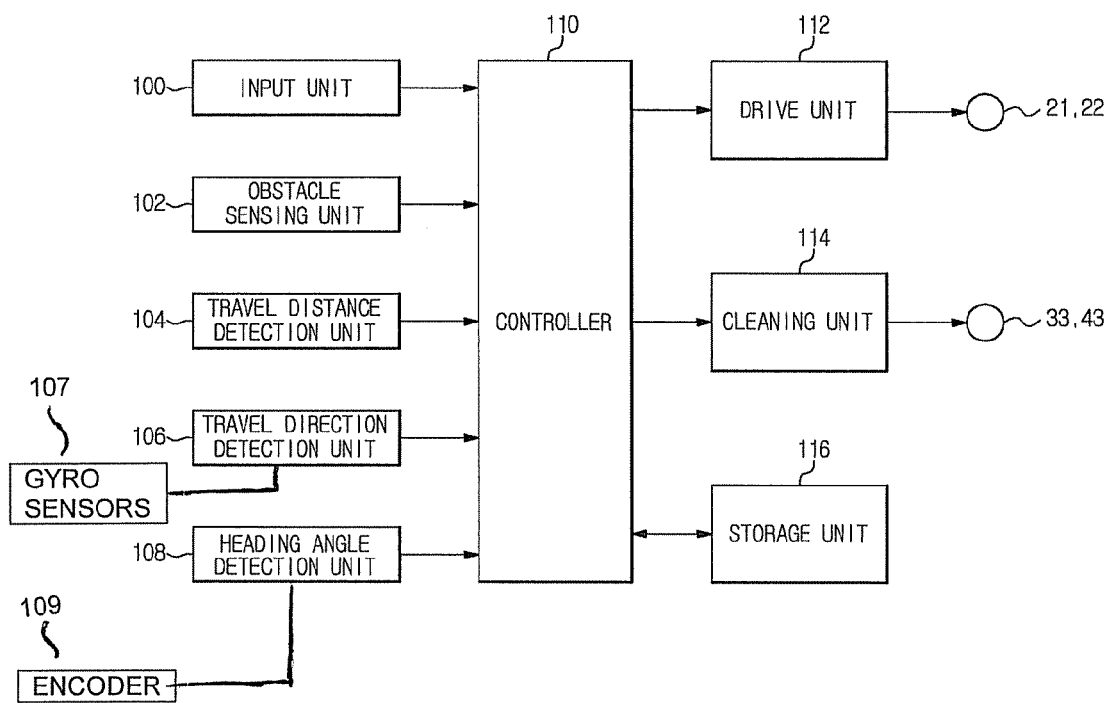
FIG. 3 illustrates a control block diagram of a robot cleaner.

FIG. 3 is a control block diagram of the robot cleaner 1. Referring to FIGS. 1 and 3, the robot cleaner includes an input unit 100, an obstacle sensing unit 102, a travel distance detection unit 104, a travel direction detection unit 106, a heading angle detection unit 108, a controller 110, a drive unit 112, a cleaning unit 114, and a storage unit 116.

The input unit 100 includes a plurality of buttons disposed at the top of the cleaner body 10 or a remote control (not shown) to allow a user to input a travelling or cleaning command to the robot cleaner 1.

The obstacle sensing unit 102 senses obstacles, such as furniture, office equipment, and walls, installed in a cleaning area in which the robot cleaner 1 travels. The obstacle sensing unit 102 transmits ultrasonic waves to a route along which the robot cleaner 1 travels and receives ultrasonic waves reflected from an obstacle to sense whether an obstacle is present or not and which direction the obstacle is located in (ahead, left, or right). The obstacle sensing unit 102 may be constituted by an infrared sensor including a plurality of infrared light emitting and receiving elements to emit infrared light and receive reflected light.

The travel distance detection unit 104 detects the travel distance of the robot cleaner 1. The travel distance detection unit 104 measures rotations of the drive wheels 21 and 22 mounted to move the robot cleaner 1 through an encoder to detect travel distance information of the robot cleaner 1.

The travel direction detection unit 106 detects the travel direction of the robot cleaner 1. The travel direction detection unit 106 measures rotational directions of the drive wheels 21 and 22 mounted to move the robot cleaner 1 through gyro sensors 107 to detect travel direction information of the robot cleaner 1.

The heading angle detection unit 108 measures a heading angle of the caster wheel 23 to detect information related to movement angle of the robot cleaner 1 which deviates left or right due to slippage in a state in which texture occurs in one direction as on a carpet. An encoder 109 is mounted to the caster wheel 23 to detect a heading angle of the caster wheel 23 which deviates left or right due to slippages of the drive wheels 21 and 22.

The controller 110 controls overall operation of the robot cleaner 1. The controller 110 controls a movement angle of the robot cleaner 1 to be detected according to the heading angle of the caster wheel 23 detected by the heading angle detection unit 108 to change rates of rotation of the drive wheels 21 and 22, i.e., the numbers of rotations of the drive wheels 21 and 22, such that the robot cleaner 1 travels straight.

The drive unit 112 drives the drive wheels 21 and 22 mounted at the lower part of the cleaner body 10 such that rotation or turning of the robot cleaner 1 is performed, while the robot cleaner 1 travels in a cleaning area without collision with a wall or an obstacle, based on location information recognized by the controller 110 and obstacle information sensed by the obstacle sensing unit 102.

The cleaning unit 114 drives the main brush motor 33 and the side brush motors 43 to suction foreign manner such as dirt from a floor in a cleaning area in which the robot cleaner 1 travels, such that the floor is cleaned, according to a drive command from the controller 110.

The storage unit 116 stores travel patterns and travel routes predetermined according to cleaning commands of the robot cleaner 1 and obstacle information sensed during travel of the robot cleaner 1.

Hereinafter, the operation of the robot cleaner with the above-stated construction will be described.

Figure 4:
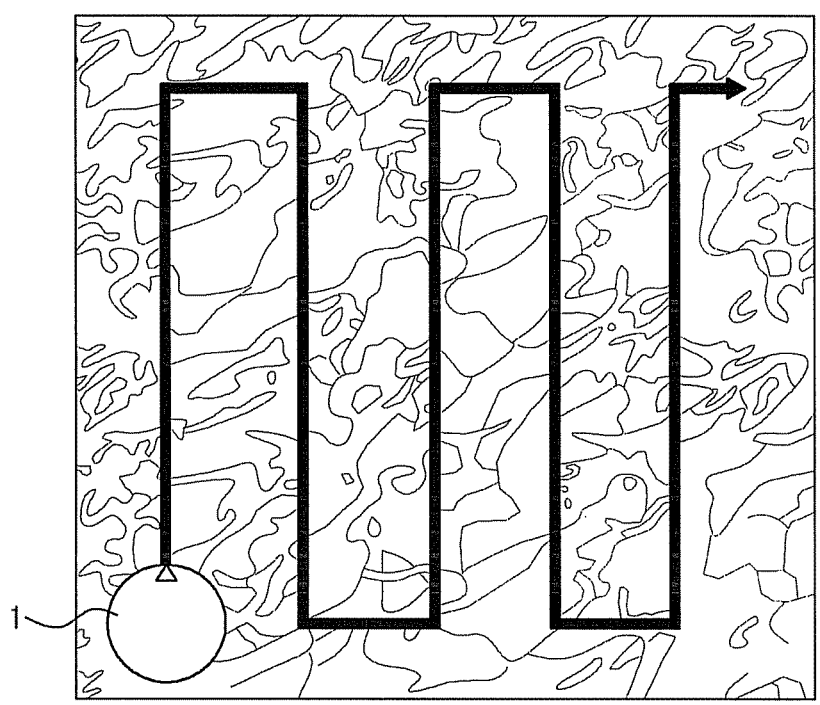
FIG. 4 illustrates a movement track of the robot cleaner on a hard floor.
Figure 5:
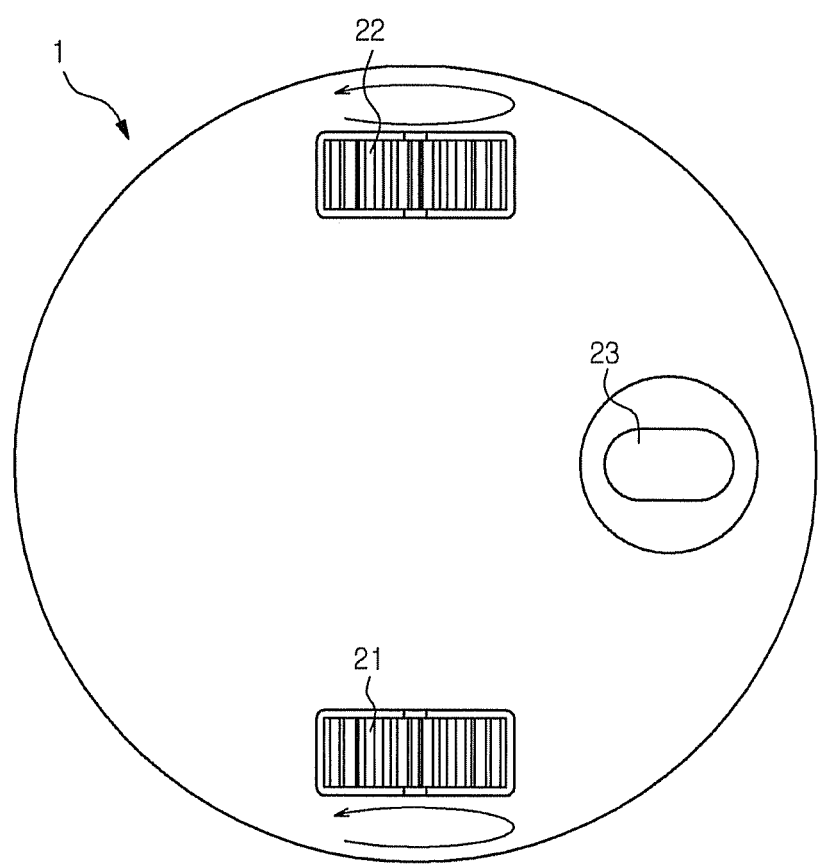
FIG. 5 illustrates rotation of a caster wheel on a hard floor, for example the hardwood floor of FIG. 4.

FIG. 4 is a view illustrating a movement track of the robot cleaner on a hard floor, and FIG. 5 is a view illustrating rotation of the caster wheel on the hard floor of FIG. 4.

Referring to FIGS. 4 and 5, when the robot cleaner 1 travels on a hard floor, such as a wooden floor or a vinyl floor, slippages of the drive wheels 21 and 22 are similar to each other, with the result that a rate of rotation of the drive wheel 21 is similar to a rate of rotation of the drive wheel 22, whereby the robot cleaner 1 easily travels straight.

When the drive wheels 21 and 22 rotate at the same rate of rotation to travel straight, therefore, the caster wheel 23 does not deviate left or right with respect to a movement axis of the robot cleaner 1, as shown in FIG. 5, with the result that a heading angle θ of the caster wheel 23 is constant.

Figure 6:
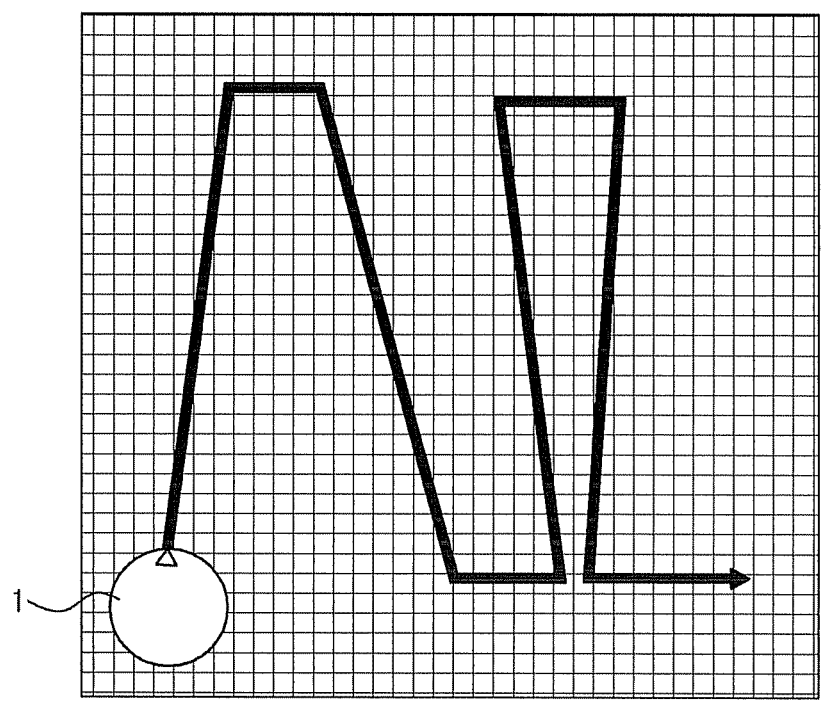
FIG. 6 illustrates a movement track of the robot cleaner on a carpet.
Figure 7:
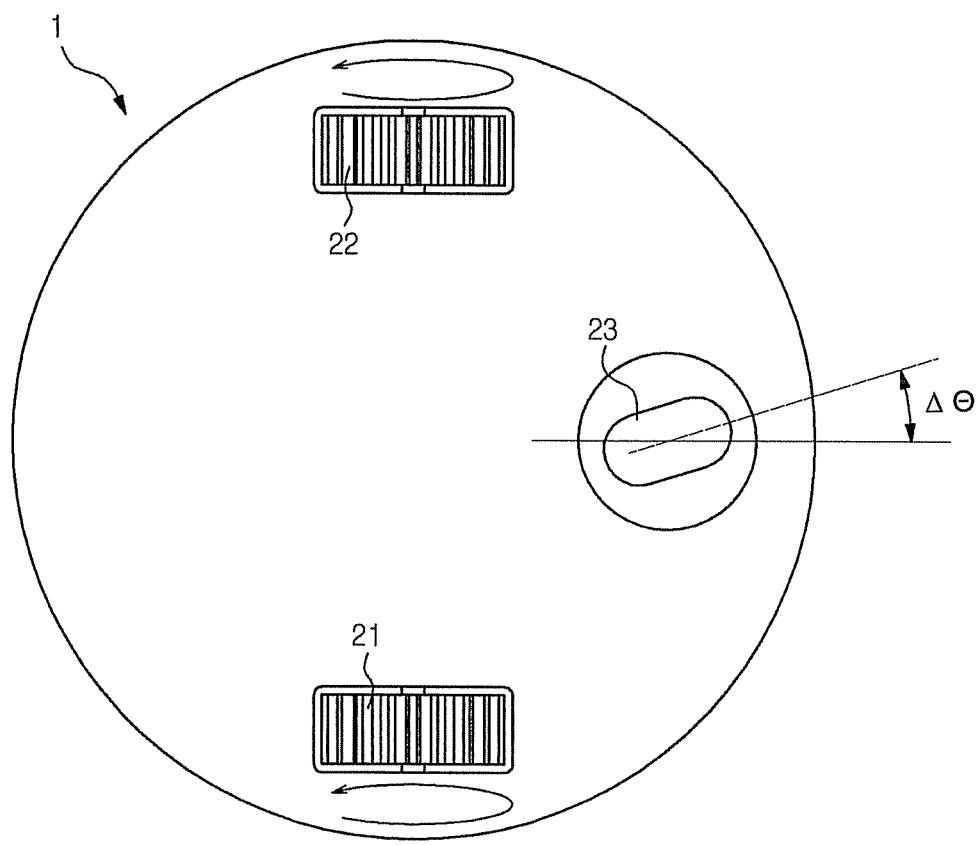
FIG. 7 illustrates rotation of the caster wheel on a carpet, for example, the carpet of FIG. 6.

FIG. 6 is a view illustrating a movement track of the robot cleaner on a carpet, and FIG. 7 is a view illustrating rotation of the caster wheel on the carpet of FIG. 6.

Referring to FIGS. 6 and 7, when the robot cleaner 1 travels on a carpet in a state in which texture of the carpet occurs in one direction, slippages of the drive wheels 21 and 22 are different from each other, with the result that the robot cleaner 1 does not travel straight but swerves often. In particular, when the texture of the carpet is severe, or the carpet pile is short, slippages of the drive wheels 21 and 22 increase, with the result that the robot cleaner 1 swerves.

Even when the drive wheels 21 and 22 rotate at the same number of rotations to travel straight, therefore, slippages of the drive wheels 21 and 22 are different from each other depending upon a state of the floor. Consequently, the caster wheel 23 deviates left or right with respect to the movement axis of the robot cleaner 1, as shown in FIG. 7, with the result that the heading angle θ of the caster wheel 23 changes. As an example, the change or deviation of the heading angle θ is shown in FIG. 7 by Δθ.

As described above, slippages of the drive wheels 21 and 22 caused depending upon a state of the floor are recognized by the change in heading angle θ of the caster wheel 23, thereby detecting the movement angle of the robot cleaner 1 deviating left or right. Consequently, the change in heading angle θ of the caster wheel 23 is detected by the heading angle detection unit 108 (FIG. 3), such as an encoder, to detect the movement angle of the robot cleaner 1 from information related to the heading angle θ.

Hereinafter, a method of controlling travel of the robot cleaner 1 to detect the movement angle of the robot cleaner 1 from the information related to the heading angle θ of the caster wheel 23 and to adjust rates of rotation of the drive wheels 21 and 22 such that the robot cleaner 1 travels straight will be described with reference to FIG. 8.

FIG. 8 illustrates a method of controlling travel of the robot cleaner according to an embodiment of the present invention.

Referring to FIGS. 1, 3, and 8, in operation 200, when a user inputs a cleaning command (automatic cleaning or partial cleaning command) to the robot cleaner 1 through the input unit 100, the controller 110 receives the cleaning command (automatic cleaning or partial cleaning command) input through the input unit 100 to determined whether cleaning has been started.

When it is determined in operation 200 that the cleaning has been started, in operation 202, the controller 110 drives motors (not shown) mounted to the drive wheels 21 and 22 through the drive unit 112 to rotate the drive wheels 21 and 22 at the same rate of rotation such that the robot cleaner 1 travels on a floor in a predetermined travel pattern (right-angle travel pattern or random travel pattern). In the right-angle travel pattern (zigzag travel pattern), the robot cleaner 1 turns 90 degrees and then travels straight when the robot cleaner 1 comes across an obstacle (for example, a wall) after straight travel. In the random travel pattern, the robot cleaner 1 turns to an arbitrary direction and then travels straight when the robot cleaner 1 comes across an obstacle (for example, a wall) after straight travel. Basically, the robot cleaner 1 travels straight.

While the robot cleaner 1 travels straight, in operation 204, the controller 110 drives the main and side brush motors 33 and 43 through the cleaning unit 114 such that the robot cleaner 1 suctions foreign matter such as dirt from the floor on which the robot cleaner 1 travels to perform cleaning.

When the robot cleaner 1 travels on a hard floor, such as a wooden floor or a vinyl floor, slippages of the drive wheels 21 and 22 are similar to each other, with the result the robot cleaner 1 easily travels straight as shown in FIG. 4.

On the other hand, when the robot cleaner 1 travels on a carpet in a state in which texture of the carpet occurs in one direction, slippages of the drive wheels 21 and 22 are different from each other, with the result that the robot cleaner 1 does not travel straight but swerves as shown in FIG. 6.

Even when the drive wheels 21 and 22 rotate at the same rate of rotation to travel straight, therefore, slippages of the drive wheels 21 and 22 are different from each other depending upon a state of the floor. Consequently, the caster wheel 23 deviates left or right with respect to the movement axis of the robot cleaner 1, as shown in FIG. 7, with the result that the heading angle θ of the caster wheel 23 changes, for example, by an amount of Δθ.

Accordingly, in operation 206, the heading angle detection unit 108 detects a heading angle θ of the caster wheel 23 which deviates left or right due to slippage, and transmits the detected heading angle θ to the controller 110.

Subsequently, in operation 208, the controller 110 detects a movement angle of the robot cleaner 1 based on the heading angle θ of the caster wheel 23 detected by the heading angle detection unit 108. Slippages of the drive wheels 21 and 22 caused depending upon a state of the floor on which the robot cleaner 23 moves are recognized by the change in heading angle (Δθ) of the caster wheel 23, thereby detecting the movement angle of the robot cleaner 1 deviating left or right. Consequently, the change in heading angle (Δθ) of the caster wheel 23 is detected by an encoder to detect the movement angle of the robot cleaner 1 from information related to the heading angle θ.

Subsequently, in operation 210, the controller 110 changes the rates of rotation of the drive wheels 21 and 22 based on information related to the movement angle of the robot cleaner 1 to correct the movement angle of the robot cleaner 1 deviating left or right such that in operation 212, the robot cleaner 1 travels straight.

Subsequently, in operation 214, the controller 110 determines whether the cleaning has been completed. When the cleaning has not been completed, the procedure returns to operation 206 where subsequent operations are repeatedly performed.

When it is determined in operation 214 that the cleaning has been completed, in operation 216, the controller 110 stops the cleaning through the drive unit 112 and the cleaning unit 114.

As is apparent from the above description, the movement angle of the robot cleaner is detected from angle information of the caster wheel rotating depending upon a state of a floor, such as a carpet in a state in which texture of the carpet occurs in one direction, and, when the movement angle of the robot cleaner deviates due to slippages of the drive wheels, rates of rotation of the drive wheels are adjusted to correct the slippages of the drive wheels such that the robot cleaner easily travels straight.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A robot cleaner comprising:
a cleaner body;
drive wheels to move the cleaner body;
a caster wheel rotatably mounted to the cleaner body;
a heading angle detection unit to detect a heading angle of the caster wheel signifying left or right deviation depending upon a state of a floor; and
a controller to adjust rates of rotation of the drive wheels based on the heading angle of the caster wheel.

2. The robot cleaner according to claim 1, wherein the drive wheels are mounted at opposite sides of a lower part of the cleaner body to adjust the movement of the cleaner body according to a drive command from the controller.

3. The robot cleaner according to claim 2, wherein the heading angle detection unit comprises an encoder provided at the caster wheel to detect a deviation angle of the caster wheel signifying left or right deviation due to slippage of the robot cleaner.

4. The robot cleaner according to claim 2, wherein the controller controls a number of rotations of the drive wheels to be adjusted based on the deviation angle of the caster wheel for the cleaner body to travel straight.

5. The robot cleaner according to claim 1, wherein the caster wheel is formed in a shape of a roller or caster and mounted at a front of the cleaner body.

6. A method of controlling travel of a robot cleaner, comprising:
detecting angle information of a caster wheel signifying left or right deviation depending upon a state of a floor; and
adjusting rates of rotation of drive wheels based on the angle information of the caster wheel to travel the robot cleaner straight.

7. The method according to claim 6, wherein the drive wheels are mounted at opposite sides of a lower part of the robot cleaner for the drive wheels to be rotated by drive force from motors.

8. The method according to claim 7, wherein the detecting the angle information of the caster wheel comprises detecting a deviation angle of the caster wheel signifying left or right deviation depending upon the state of the floor.

9. The method according to claim 8, wherein the detecting the deviation angle information of the caster wheel comprises detecting a heading angle of the caster wheel deviating left or right due to slippage of the robot cleaner through an encoder provided at the caster wheel.

10. The method according to claim 8, wherein the adjusting the rates of rotation of the drive wheels comprises changing a number of rotations of the drive wheels based on the deviation angle of the caster wheel to correct a movement angle of the robot cleaner for the robot cleaner to travel straight.

11. The method according to claim 6, wherein the caster wheel is mounted at a front of the robot cleaner for the caster wheel to rotate depending upon the state of the floor without drive force from a motor.

12. A robot cleaner comprising:
wheels;
a wheel heading angle deviation detector to detect a heading angle deviation of one of the wheels; and
a wheel rotation rate controller to adjust a rate of rotation for at least one of the wheels based on the heading angle deviation.

13. The robot cleaner of claim 12, wherein the wheel heading angle deviation detector detects the heading angle deviation of a caster wheel rotatably mounted in the robot cleaner.

14. The robot cleaner of claim 13, further comprising an encoder mounted to the caster wheel to detect a heading angle of the caster wheel.

15. The robot cleaner of claim 12, wherein the wheel rotation rate controller adjusts the rate of rotation for a drive wheel mounted at a side of the robot cleaner.

16. The robot cleaner of claim 12, further comprising:
an obstacle sensor to sense a presence of an obstacle, and a direction in which the obstacle exists with respect to the robot cleaner,
wherein the wheel rotation rate controller adjusts the rate of rotation for the at least one of the wheels while simultaneously avoiding obstacles sensed by the obstacle sensor.

17. The robot cleaner of claim 12, wherein the wheel rotation rate controller adjusts the rate of rotation for the at least one of the wheels based also on a predetermined travel pattern for travel of the robot cleaner.

18. The robot cleaner of claim 12, further comprising:
a travel distance detector to measure rotational directions of at least two of the wheels, the at least two wheels being drive wheels,
wherein the wheel rotation rate controller adjusts the rate of rotation for at least one of the drive wheels according to the measured rotational directions.

19. The robot cleaner of claim 18 wherein the travel distance detector includes a gyro sensor.

\* \* \* \* \*